(12) United States Patent
Groff (10) Patent No.: US 12,382,376 B2
(45) Date of Patent: Aug. 5, 2025

(54) GEOFENCING USING A PRIORITY ACCESS LICENSE PROTECTION AREA

(71) Applicant: DISH Wireless L.L.C., Englewood, CO (US)

(72) Inventor: Montgomery Groff, Denver, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 470 days.

(21) Appl. No.: 17/975,387

(22) Filed: Oct. 27, 2022

(65) Prior Publication Data

US 2024/0147353 A1    May 2, 2024

(51) Int. Cl.
*H04W 48/16*    (2009.01)
*H04W 4/021*    (2018.01)
*H04W 12/72*    (2021.01)
*H04W 16/14*    (2009.01)

(52) U.S. Cl.
CPC .......... *H04W 48/16* (2013.01); *H04W 4/021* (2013.01); *H04W 12/72* (2021.01); *H04W 16/14* (2013.01)

(58) Field of Classification Search
CPC ..... H04W 48/16; H04W 4/021; H04W 12/72; H04W 16/14; H04W 48/04
See application file for complete search history.

(56) References Cited

U.S. PATENT DOCUMENTS

| 11,589,250 | B2 * | 2/2023 | Sevindik | H04W 16/14 |
| 2020/0008007 | A1 * | 1/2020 | Belghoul | H04W 4/50 |
| 2023/0116761 | A1 * | 4/2023 | Barry | H04M 15/51 |
| | | | | 370/329 |

OTHER PUBLICATIONS

Jai, Naru, et al. "An Optimized Move List for Dynamic Protection Area in CBRS." IEEE Transactions on Cognitive Communications and Networking (2024). (Year: 2024)*
Google, "Manage PAL Protection Areas (PPAs)," Help Center, SAS Help, 2 pages, retrieved Oct. 26, 2022: https://support.google.com/sas/answer/10601779?hl=en#:~: text=A%20PPA%20is%20a%20geographic,or%20more%20PAL%2Dprotected%20CBSDs.
Wireless Innovation Forum, "Requirements for Commercial Operation in the U.S. 3550-3700 MHZ Citizens Broadband Radio Service Band," Document WINNF-TS-0112 Version V1.9.1, CBRS WInnForum Standards, Mar. 11, 2020, 81 pages.

* cited by examiner

*Primary Examiner* — Sharad Rampuria
(74) *Attorney, Agent, or Firm* — Seed IP Law Group LLP (57) ABSTRACT

A method and apparatus for geofencing a user equipment in relation to a priority access license (PAL) protection area of a citizens broadband radio service device (CBSD) are provided. The CBSD operates on a channel of a Citizens Broadband Radio Service (CBRS) band. A user equipment provisioning server receives an indication of the PAL protection area associated with the CBSD. The user equipment provisioning server provisions the user equipment to limit the user equipment to operating within the PAL protection area or exclude the user equipment from operating within the PAL protection area.

17 Claims, 6 Drawing Sheets

GEOFENCING USING A PRIORITY ACCESS LICENSE PROTECTION AREA

BACKGROUND

The Citizens Broadband Radio Service (CBRS) has tiered access that allows both priority access holders (that have priority access licenses) and others user (who operate using general authorized access (GAA)) to utilize a 150 megahertz (MHz) band between 3550 MHz and 3700 MHz. Wireless carriers can deploy fifth generation (5G) infrastructure to use the CBRS. Accordingly, a variety of devices pertaining to subscribers of multiple carriers may simultaneously operate within the CBRS band.

BRIEF SUMMARY

In an embodiment, a user equipment provisioning server includes a processor and memory configured to store executable instructions that, when executed by the processor, cause the processor to: receive an indication of a priority access license (PAL) protection area associated with a citizens broadband radio service device (CBSD) of an operator having a priority access license to a Citizens Broadband Radio Service (CBRS) channel of a CBRS band, where the PAL protection area represents a geographic area surrounding the CBSD and in which the CBSD uses the CBRS channel. In an embodiment, the executable instructions, when executed by the processor, cause the processor to determine whether to fence a user equipment of a subscriber of the operator inside or outside of the PAL protection area and provision the user equipment to limit the user equipment to operating within the PAL protection area or exclude the user equipment from operating within the PAL protection area.

In an embodiment, the executable instructions, when executed by the processor to provision the user equipment, cause the processor to configure a profile of an embedded-Subscriber Identity Module (eSIM) of the user equipment with configuration information specifying whether the user equipment is limited to operating within the PAL protection area or excluded from operating within the PAL protection area. In an embodiment, the executable instructions, when executed by the processor, cause the processor to send the configuration information to the user equipment for configuring the profile of the eSIM.

In an embodiment, the executable instructions cause the processor to receive the indication of the PAL protection area from a spectrum access system (SAS) server, where the PAL protection area is determined based on: a location of the CBSD, an effective isotropic radiated power (EIRP) of the CBSD, a height, gain, azimuth or beam width of an antenna of the CBSD, and a propagation model.

In an embodiment, a system includes user equipment of a subscriber of an operator and a citizens broadband radio service device (CBSD) having a priority access license (PAL) protection area and managed by the operator having a priority access license to a Citizens Broadband Radio Service (CBRS) channel of a CBRS band, where the PAL protection area represents a geographic area surrounding the CBSD and in which the CBSD uses the CBRS channel. In an embodiment, the system includes a user equipment provisioning server configured to: receive an indication of the PAL protection area associated with the CBSD; determine whether to fence a user equipment inside or outside of the PAL protection area; and provision the user equipment to limit the user equipment to operating within the PAL protection area or exclude the user equipment from operating within the PAL protection area.

In an embodiment, the user equipment provisioning server is configured to provision the user equipment by configuring a profile of an embedded-Subscriber Identity Module (eSIM) of the user equipment with configuration information specifying whether the user equipment is limited to operating within the PAL protection area or excluded from operating within the PAL protection area. In an embodiment, the user equipment is configured to: receive configuration information specifying that the user equipment is limited to operating within the PAL protection area or excluded from operating within the PAL protection area; and modify a profile of an embedded-Subscriber Identity Module (eSIM) of the user equipment based on the configuration information.

In an embodiment, the user equipment is configured to: receive boundary information of the PAL protection area; determine a position of the user equipment; receive configuration information specifying that the user equipment is limited to operating within the PAL protection area or excluded from operating within the PAL protection area; and determine, based on the boundary information, the position of the user equipment and the configuration information, whether the user equipment is to communicate with the CBSD or on the CBRS channel. In an embodiment, the user equipment provisioning server is configured to receive the indication of the PAL protection area from a spectrum access system (SAS) server, wherein the PAL protection area is determined based on: a location of the CBSD, an effective isotropic radiated power (EIRP) of the CBSD, a height, gain, azimuth or beam width of an antenna of the CBSD, and a propagation model.

In an embodiment, the user equipment is configured to: in response to being limited to operating within the PAL protection area, refrain from transmitting non-emergency user data to the CBSD when the user equipment is positioned outside of the PAL protection area, or in response to being excluded from operating within the PAL protection area, refrain from transmitting the non-emergency user data to the CBSD when the user equipment is positioned inside of the PAL protection area. In an embodiment, the user equipment is configured to: in response to being limited to operating within the PAL protection area, transmit emergency user data to the CBSD when the user equipment is positioned outside of the PAL protection area, or in response to being excluded from operating within the PAL protection area, transmit the emergency user data to the CBSD when the user equipment is positioned inside of the PAL protection area.

In an embodiment, the user equipment is configured to: in response to being limited to operating within the PAL protection area, receive control information from the CBSD when the user equipment is positioned outside of the PAL protection area, or in response to being excluded from operating within the PAL protection area, receive control information from the CBSD when the user equipment is positioned inside of the PAL protection area.

In an embodiment, a method includes operating, by a citizens broadband radio service device (CBSD), in a Citizens Broadband Radio Service (CBRS) channel of a CBRS band, where the CBSD has a priority access license (PAL) protection area and is managed by the operator having a priority access license to the CBRS channel, and where the PAL protection area represents a geographic area surrounding the CBSD. In an embodiment, the method includes receiving, by a user equipment provisioning server, an indication of the PAL protection area associated with the CBSD; determining, by the user equipment provisioning server, whether to fence a user equipment inside or outside of the PAL protection area; and provisioning, by the user equipment provisioning server, the user equipment to limit the user equipment to operating within the PAL protection area or exclude the user equipment from operating within the PAL protection area.

In an embodiment, provisioning the user equipment includes: configuring a profile of an embedded-Subscriber Identity Module (eSIM) of the user equipment with configuration information specifying whether the user equipment is limited to operating within the PAL protection area or excluded from operating within the PAL protection area. In an embodiment, the method includes receiving, by the user equipment, configuration information specifying that the user equipment is limited to operating within the PAL protection area or excluded from operating within the PAL protection area; and modifying, by the user equipment, a profile of an embedded-Subscriber Identity Module (eSIM) of the user equipment based on the configuration information.

In an embodiment, the method includes receiving, by the user equipment, boundary information of the PAL protection area; determining, by the user equipment, a position of the user equipment; receiving, by the user equipment, configuration information specifying that the user equipment is limited to operating within the PAL protection area or excluded from operating within the PAL protection area; and determining, based on the boundary information, the position of the user equipment and the configuration information, whether the user equipment is to communicate with the CBSD or on the CBRS channel.

In an embodiment, the method includes receiving, by the user equipment provisioning server, the indication of the PAL protection area from a spectrum access system (SAS) server, where the PAL protection area is determined based on: a location of the CBSD, an effective isotropic radiated power (EIRP) of the CBSD, a height, gain, azimuth or beam width of an antenna of the CBSD, and a propagation model. In an embodiment, the method includes in response to being limited to operating within the PAL protection area, refraining, by the user equipment, from transmitting non-emergency user data to the CBSD when the user equipment is positioned outside of the PAL protection area, or in response to being excluded from operating within the PAL protection area, refraining, by the user equipment, from transmitting the non-emergency user data to the CBSD when the user equipment is positioned inside of the PAL protection area.

In an embodiment, the method includes in response to being limited to operating within the PAL protection area, transmitting, by the user equipment, emergency user data to the CBSD when the user equipment is positioned outside of the PAL protection area, or in response to being excluded from operating within the PAL protection area, transmitting, by the user equipment, the emergency user data to the CBSD when the user equipment is positioned inside of the PAL protection area. In an embodiment, the method includes in response to being limited to operating within the PAL protection area, receiving, by the user equipment, control information from the CBSD when the user equipment is positioned outside of the PAL protection area, or in response to being excluded from operating within the PAL protection area, receiving, by the user equipment, control information from the CBSD when the user equipment is positioned inside of the PAL protection area.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
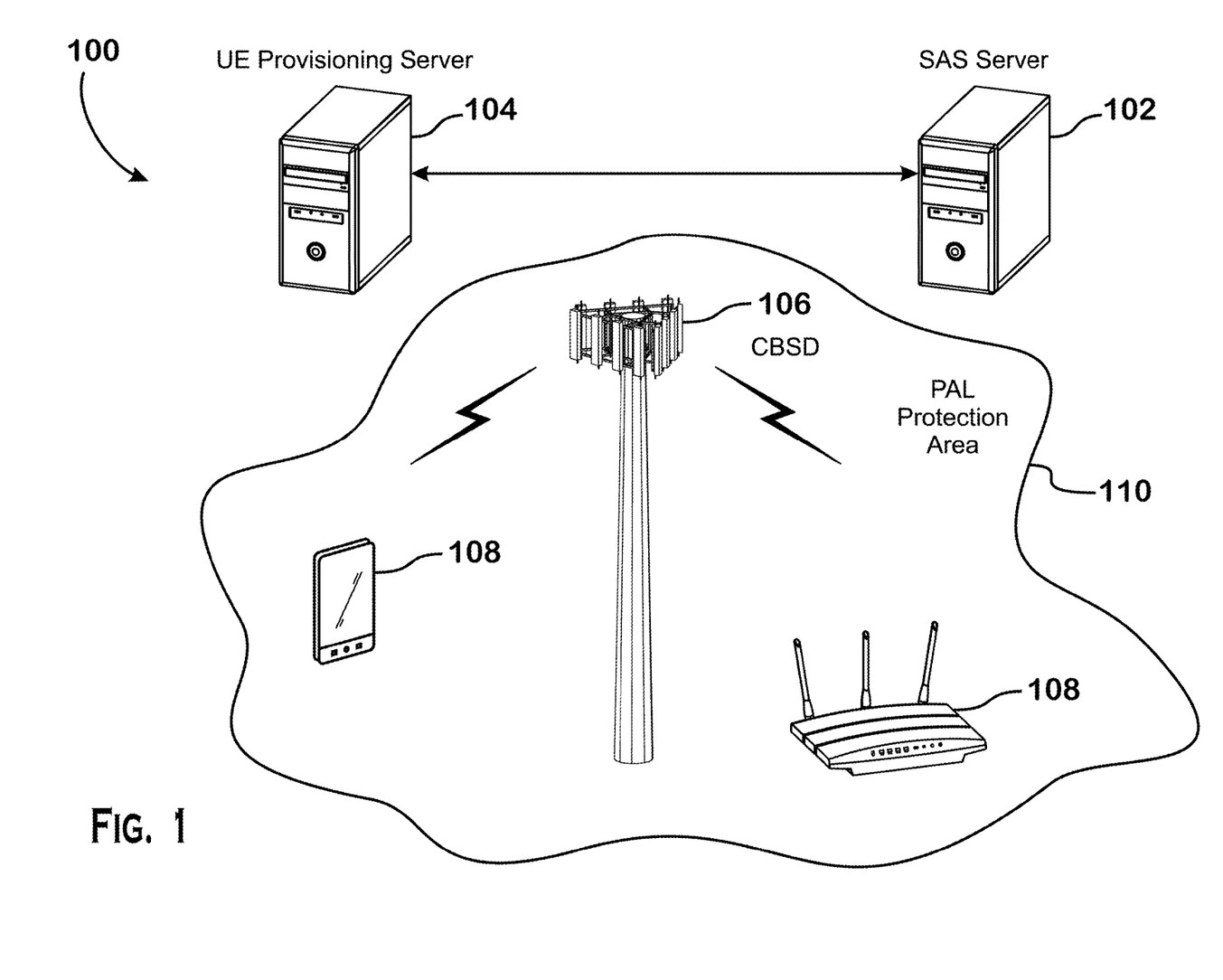
FIG. 1 shows an environment in which a priority access license (PAL) protection area (PPA) is enforced.

FIG. 1 shows an environment 100 in which a priority access license (PAL) protection area (PPA) 110 is enforced.

The environment 100 includes a spectrum access system (SAS) server 102, a user equipment (UE) provisioning server 104, a citizens broadband radio service device (referred to as a 'CBSD') 106 and user equipment 108. The SAS server 102, UE provisioning server 104, CBSD 106 and user equipment 108 may be part of a wireless communication system, such as a 5G cellular network or other type of cellular or communication network. Also shown in FIG. 1 is a priority access license (PAL) protection area (PPA) 110 associated with the CBSD 106. The PAL protection area 110 is a geographic area associated with the CBSD 106, whereby the PAL protection area 110 may surround the CBSD 106. The PAL protection area 110 may be a geographic area in which the CBSD 106 can serve user equipment 108, whereby, for example, transmissions by the CBSD 106 may be received by the user equipment 108 with a sufficient signal-to-interference-and-noise ratio (SINR) in the PAL protection area 110. Similarly, transmissions by the user equipment 108 to the CBSD 106 may be received by the CBSD 106 with a sufficient SINR as to enable reliable communication between the user equipment 108 to the CBSD 106. The PAL protection area 110 may be the coverage area of the CBSD 106 or may include areas within a range of transmissions of the CBSD 106.

The PAL protection area 110 may have a shape or a boundary, and the user equipment 108 may be geofenced in relation to the PAL protection area 110. For example, the user equipment 108 may be fenced in the PAL protection area 110 to limit the user equipment 108 to operating within the PAL protection area 110 or the user equipment 108 may be fenced out of the PAL protection area 110 to limit the user equipment 108 from operating within the PAL protection area 110. The environment 100 may utilize the Citizens Broadband Radio Service (CBRS) band for communication. The CBRS band is between 3550 and 3700 megahertz (MHz), and the rules of the CBRS band are codified in 47 C.F.R. 96. The CBRS band may be divided into channels, whereby a CBRS channel may have any width within the CBRS band. For example, a 10 MHz CBRS channel may be between 3550 and 3560 MHz.

The CBSD 106 may be any device that operates in a CBRS channel to provide cellular coverage to user equipment and receives authorization from the SAS server 102 to operate in the channel. For example, the CBSD 106 may be a base station, wireless gateway or an eNodeB, among others. In addition, the CBSD 106 may be a user equipment that operates as a relay between other user equipment and a CBSD. The CBSD 106 may transmit data to and receive data from the user equipment 108a, 108b over any portion of the CBRS band, such as a 10 MHz channel between 3550 and 3560 MHz. The CBSD 106 may operate in accordance with any communication protocol including a cellular communication protocol, such as Long-Term Evolution (LTE), LTE-Advanced (LTE-A), fifth generation (5G) or new radio.

The SAS server 102 may be any computer system configured to control operation of the CBSD 106 (as well as other CBSDs (not shown) in the environment 100). The SAS server 102 protects and prioritizes higher-priority users, such as service providers having priority access licenses, over lower-priority (or lower-tiered) users who share the spectrum under a general authorized access (GAA). The SAS server 102 also determines the PAL protection area 110 associated with the CBSD 106. For example, the CBSD 106 may be operated by a holder of a priority access license for a channel of the CBRS band. When the operator wishes to operate the CBSD 106 in the channel, the operator requests from the SAS server 102 a grant to operate. The SAS server 102 determines the PAL protection area 110 associated with the CBSD 106. Determining the PAL protection area 110 may include determine the boundaries, dimensions, size, shape or some combination thereof of a geographic area associated with the CBSD 106. The PAL protection area 110 may be a geographic area in which the CBSD 106 provides cellular coverage to user equipment. The PAL protection area 110 may be established to mitigate interference (from other CBSDs) onto the cellular traffic of the CBSD 106. The SAS server 102 may prevent the other CBSDs from operating in the PAL protection area 110. For example, if the SAS server 102 receives a request from another CBSD to operate in the PAL protection area 110, the SAS server 102 may deny the request. Further, the SAS server 102 may monitor the PAL protection areas of various CBSDs to ensure that the PAL protection areas do not encroach on each other. As described herein, the PAL protection area 110 of the CBSD 106 may increase in size or geographic area when the CBSD 106 increases its radiated power (or transmission power). The SAS server 102 may receive an indication of the radiated power from the CBSD 106. The SAS server 102 may monitor the radiated power to ensure that the CBSD 106 does not increase the radiated power, and consequently expand the geographic size of the PAL protection area 110, as to encroach on the PAL protection area of another CBSD (e.g., a neighboring CBSD). If the SAS server 102 determines that the CBSD 106 encroaches on the PAL protection area of the other CBSD, the SAS server 102 may send a request to the CBSD 106 to reduce the radiated power. The SAS server 102 may be operated by a different entity than the CBSD 106.

The CBSD 106 may transmit and receive data in an isotropic fashion (e.g., in every direction of a horizontal plane). Accordingly, the PAL protection area 110 may be a geographic area surrounding the CBSD 106 and including a location where the CBSD 106 is positioned. Alternatively, the CBSD 106 may be directional and may transmit and receive data in a first range of directions, but not in a second range of directions. Thus, the PAL protection area 110 may include geographic areas that fall within the first range of directions, but may not include other areas in the second range of directions.

Use of the PAL protection area ensures that an operator (an operator with a priority access license and an operator using the spectrum under the general authorized access provisions) does not extend or expand their coverage areas (for example, by increasing radiated power) and interfere with other operators. It is noted that, in addition to geographic-based limitations, the SAS server 102 may also limit the CBSD 106 to operating in one or more CBRS channels of the CBRS band (for example, the CBSD 106 may be limited to operating in one or more CBRS channels to which an operator of the CBSD 106 has a priority access license) or to operating at specific times (for example, days or hours of the day for which the operator of the CBSD 106 requested permission to use the one or more channels). The SAS server 102 may determine the PAL protection area 110 based on a geographic location of the CBSD 106; an effective isotropic radiated power (EIRP) of the CBSD 106; a height, gain, azimuth, or beam width of an antenna of the CBSD 106; and a propagation model. The SAS server 102 may use the propagation model defined by The Wireless Innovation Forum (WInnForum) in "Requirements for Commercial Operation in the U.S. 3550-3700 MHz Citizens Broadband Radio Service Band," Document WINNF-TS-0112, Version V1.9.1 (Mar. 11, 2020). The SAS server 102 may receive information indicating the geographic location of the CBSD 106; the EIRP; or the height, gain, azimuth or beam width of the antenna from the CBSD 106 or from an operator of the CBSD 106. The SAS server 102 may receive the information together with a request for the CBSD 106 to operate on a CBRS channel for which the operator has a priority access license. The SAS server 102 may use the geographic location and the EIRP of the CBSD 106, as well as the height, gain, azimuth or beam width of the antenna of the CBSD 106, as inputs to the propagation model. The SAS server 102 determines, based on the propagation model, the PAL protection area 110.

The SAS server 102 enforces the PAL protection area 110 and mitigates interference from a neighboring CBSD onto the PAL protection area 110. For example, the SAS server 102 may request that the neighboring CBSD reduce its power so as to keep radio interference onto the PAL protection area 110 under a specified level. In addition, the SAS server 102 may refrain from granting another CBSD (for example, associated with a holder of another priority access license) permission to operate within the PAL protection area 110.

The UE provisioning server 104 may be any computer system configured to fence in or fence out a user equipment 108 in relation to a geofence associated with the PAL protection area 110. The UE provisioning server 104 may be managed by an operator of the CBSD 106, the user equipment 108 or both. For example, the operator may be an internet service provider or a cellular network or service provider that deployed the CBSD 106 to provide coverage to a subscriber utilizing the user equipment 108. The UE provisioning server 104 may receive the boundaries, dimensions, size and/or shape of the PAL protection area 110 from the SAS server 102. In some situations, the UE provisioning server 104 may fence in the user equipment 108 by configuring the user equipment 108 to exclusively communicate within the PAL protection area 110 and/or other PAL protection areas or exclusively communicate with the CBSD 106. In other situations, the UE provisioning server 104 may fence out the user equipment 108 by configuring the user equipment 108 to exclusively communicate outside of the PAL protection area 110 and/or other PAL protection areas. For example, the UE provisioning server 104 may configure a Subscriber Identity Module (SIM) or a programmable embedded-SIM (eSIM) of the user equipment 108. Provisioning the SIM or eSIM may cause the user equipment 108 to disable communication on the CBRS channel of the CBSD 106 when the user equipment 108 is no longer positioned within the PAL protection area 110. The user equipment 108 may be configured to communicate on the CBRS channel of the CBSD 106 so long as the user equipment 108 is positioned within the PAL protection area 110. However, if the user equipment 108 leaves the boundaries of the PAL protection area 110, the user equipment 108 disables communication on the CBRS channel. Accordingly, the user equipment 108 may not communicate using the CBRS channel with a neighboring CBSD outside of the PAL protection area 110.

The UE provisioning server 104 may configure the eSIM of the user equipment 108 "over the air" by sending configuration information for the eSIM directly to the user equipment 108 or by sending the configuration information to the CBSD 106 for transmission to the user equipment 108. The user equipment 108 uses the eSIM configuration information to authenticate when communicating or when establishing communication with the CBSD 106 as well as other network entities. For example, the eSIM information may be used to verify whether the user equipment 108 is a device of a subscriber to an operator of the CBSD 106 before granting the user equipment 108 permission to send user data to and receive user data from the CBSD 106. Further, the eSIM information may be used to verify whether the user equipment 108 is fenced in or fenced out of a PAL protection area. After configuring the eSIM, the UE provisioning server 104, the CBSD 106 (or another network entity) may use the configuration information of the user equipment 108 to determine whether the user equipment 108 may communicate in the PAL protection area 110 (if any) in which the user equipment 108 is located.

A position of the user equipment 108 may be identified using positioning circuitry and/or positioning techniques. For example, Global Positioning System (GPS) data or assisted GPS or augmented GPS (A-GPS) data may be used to identify the location of the user equipment 108. Further, other techniques, such as enhanced observed time difference (E-OTD), time of arrival (TOA), angle of arrival (AOA) or Wi-Fi hotspot-based location detection may be used to identify the position of the user equipment 108. The position of the user equipment 108 may then be used to determine whether the user equipment 108 is inside or outside of the PAL protection area 110 and accordingly determine whether to limit operation of the user equipment 108.

Figure 2:
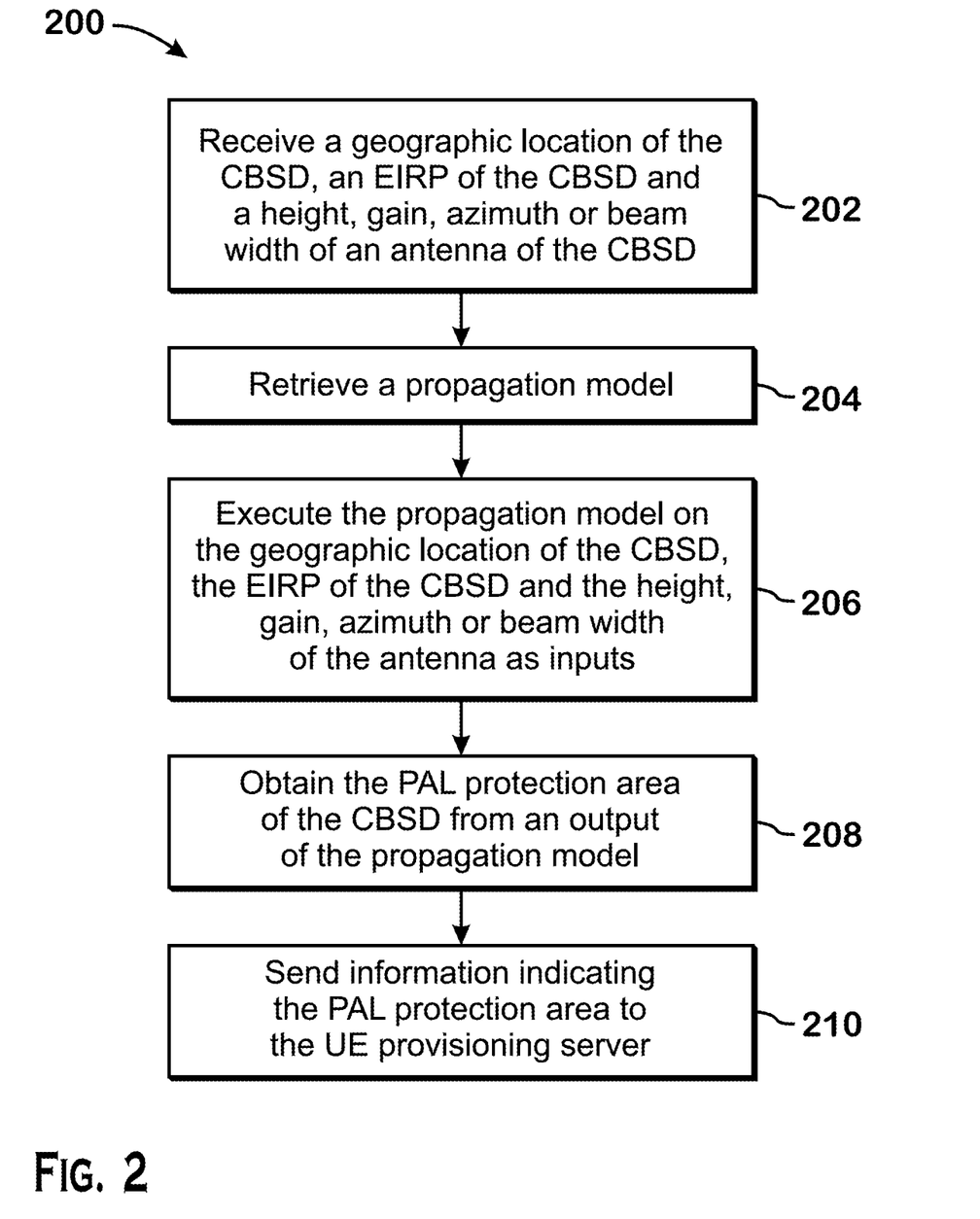
FIG. 2 shows a flow diagram of a method for determining a PAL protection area.

FIG. 2 shows a flow diagram of a method 200 for determining a PAL protection area. In the method 200, the SAS server 102, at 202, receives, from the CBSD 106 or an operator of the CBSD 106, a geographic location of the CBSD 106; an EIRP of the CBSD 106, as well as a height, gain, azimuth or beam width of an antenna of the CBSD 106. The SAS server 102 has access to a propagation model, whereby the propagation model may be stored on a memory of the SAS server 102 and a processor of the SAS server 102 may retrieve the propagation model. At 204, the SAS server 102 retrieves the propagation model. The SAS server 102 may retrieve the propagation model before, after or at the same time as receiving (i) the geographic location of the CBSD 106; (ii) the EIRP and (iii) the height, gain, azimuth or beam width of the antenna of the CBSD 106.

The SAS server 102, at 206, executes (or runs) the propagation model on the geographic location of the CBSD 106, the EIRP of the CBSD 106 and the height, gain, azimuth or beam width of the antenna as inputs. The SAS server 102 inputs the geographic location of the CBSD 106, the EIRP of the CBSD 106 and the height, gain, azimuth or beam width of the antenna to the propagation model. Upon execution, the propagation model yields the PAL protection area of the CBSD 106. At 208, the SAS server 102 obtains the PAL protection area from an output of the propagation model. At 210, the SAS server 102 sends information indicating the PAL protection area to the UE provisioning server 104 for geofencing user equipment.

The CBSD may operate in a channel of the CBRS band. The CBSD may belong to an operator (for example, an internet or wireless service provider) that has priority access license for the channel or the band. The SAS server 102 may grant the CBSD permission to transmit and receive data on the channel. The SAS server 102 blocks other CBSDs from actively transmitting and receiving data using the channel within the PAL protection area. The SAS server 102 may also cause neighboring CBSDs to adjust their transmission powers to mitigate excessive interference onto the PAL protection area. An operator may utilize the PAL protection area to enforce rules on subscribers of the operator. For example, the operator may prevent the user equipment 108 of the operator's own subscriber from actively communicating with a CBSD or using the channel when the user equipment 108 leaves the PAL protection area.

Figure 3:
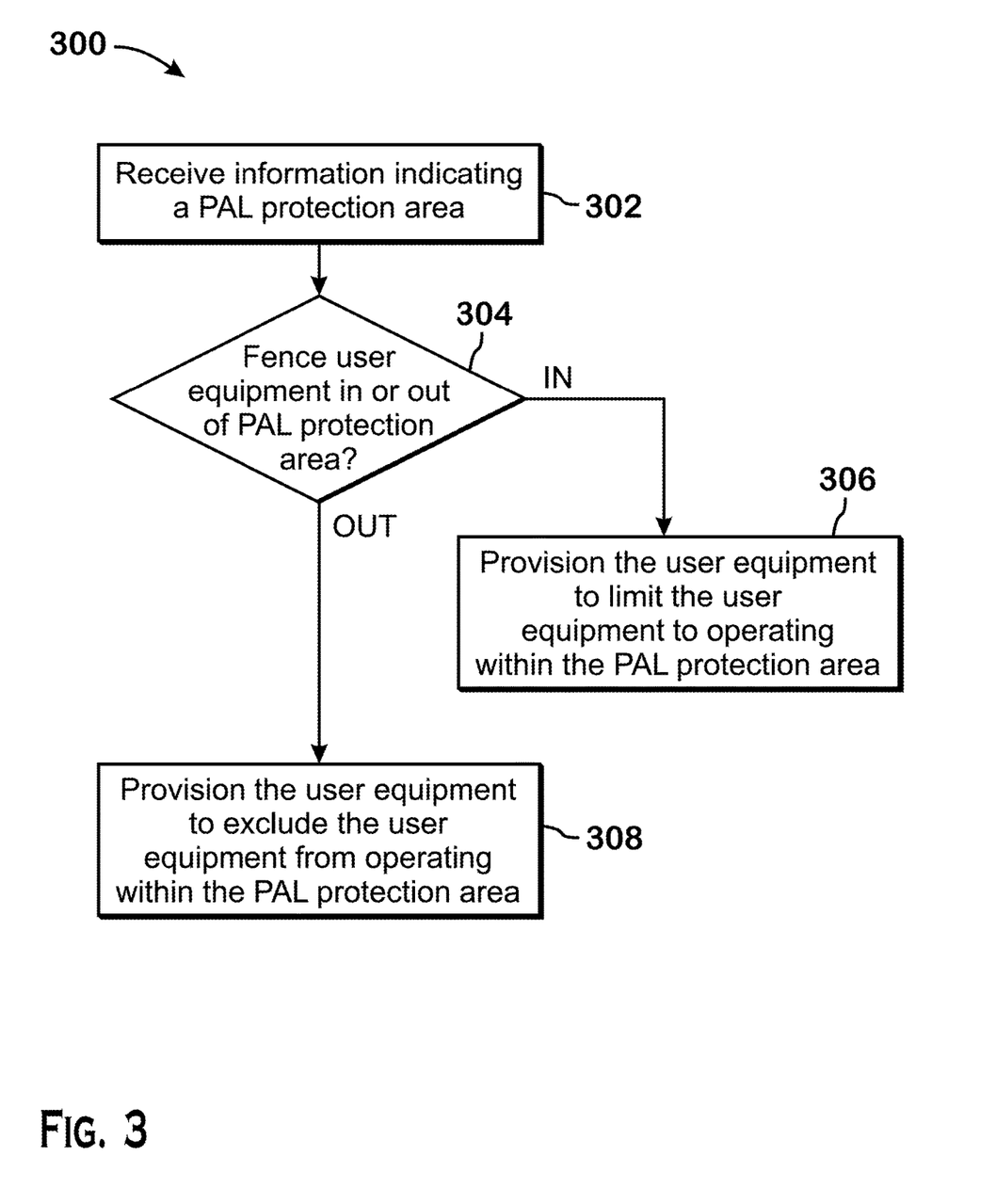
FIG. 3 shows a flow diagram of another method for provisioning a user equipment for geofencing.

FIG. 3 shows a method 300 for provisioning the user equipment 108 for geofencing. As described herein, the UE provisioning server 104 may be managed by the operator. The UE provisioning server 104, at 302, receives information indicating a PAL protection area. As described herein, the UE provisioning server 104 may receive the information from the SAS server 102. The UE provisioning server 104, at 304, determines whether the user equipment 108 is to be fenced in the PAL protection area or fenced out of the PAL protection area.

In response to determining that the user equipment 108 is to be fenced in the PAL protection area, the UE provisioning server 104, at 306, provisions the user equipment 108 to limit the user equipment 108 to operating within the PAL protection area. Limiting the user equipment 108 to operating within the PAL protection area may render the user equipment 108 inoperative for communication with the CBSD while the user equipment 108 is outside the PAL protection area. For example, the user equipment 108 may not send or receive data using the channel or with the CBSD when the user equipment 108 is positioned outside of the PAL protection area.

Provisioning the user equipment 108 may include configuring the SIM or eSIM of the user equipment 108 to cause the user equipment 108 to cease data transmission and reception when the user equipment 108 is outside the PAL protection area. The SIM or eSIM has installed or saved thereon a profile for the user equipment 108 or subscriber, whereby the profile may be provided by the operator. The profile may include keys (or identities (IDs)) for authenticating with CBSD 106 or another network entity. The UE provisioning server 104 may send eSIM profile information to the user equipment 108, whereby the eSIM profile information may limit the user equipment 108 to operating within the PAL protection area. The eSIM may store the profile information. The profile information may include a key or an ID that specifies (or encodes) a restriction limiting the user equipment 108 to operating within the PAL protection area.

Accordingly, when the user equipment 108 communicates with the CBSD 106 to request establishing communication with the CBSD 106, the CBSD 106 identifies that the user equipment 108 is geofenced. For example, the user equipment 108 may send control information including the key or ID. The CBSD 106 evaluates the key or ID and determines that the user equipment 108 is geofenced in relation to a PAL protection area. For example, the CBSD 106 may store in a memory (or may have access to) a database of PAL protection areas and geographic boundaries thereof. The CBSD 106 may identify the position of the user equipment 108. If the CBSD 106 determines that the user equipment 108 is outside the PAL protection area, the CBSD 106 may cease communication with the user equipment 108. The CBSD 106 may also send a notification to the user equipment 108 indicating that the communication is ceased because the user equipment 108 is limited to communicating within the PAL protection area.

Alternatively, the one or more keys of the eSIM profile may be used by the user equipment 108 to descramble or decode data received from the CBSD. The data may include control information. To receive and properly descramble or decode the control information, the user equipment 108 is to obtain the relevant one or more keys that are usable descrambling or decoding. The UE provisioning server 104 may change the one or more keys of the eSIM profile depending on a position of the user equipment 108, whereby the position may be reported to the UE provisioning server 104 by the user equipment 108 or the CBSD 106. For example, if the user equipment 108 leaves the PAL protection area, the UE provisioning server 104 provisions the user equipment 108 by changing the one or more keys of the eSIM profile. The new keys may be unusable to descramble or decode the control information thereby denying the user equipment 108 the ability to receive data or communicate with the CBSD 106. Alternatively, the provisioning may include removing the one or more keys from the eSIM profile. Thus, the user equipment 108 no longer has access to the one or more keys, and the user equipment 108 properly descramble or decode data from the CBSD 106 as to recover its contents.

Provisioning the user equipment 108 may include configuring software (e.g., software application), code or operational or executable instructions of the user equipment 108 to cause the user equipment 108 to cease data communication. For example, the executable instructions of the user equipment 108 may be independently configured to cause the user equipment 108 to refrain from initiating transmission or reception operations when the user equipment 108 enters or leaves a PAL protection area. Alternatively, the executable instructions of the user equipment 108 may be configured to access an eSIM or SIM of the user equipment 108 in order to determine whether the user equipment 108 is fenced in relation to a PAL protection area. If the user equipment 108 is fenced, then the software of the user equipment 108 may self-enforce the fencing. Provisioning the user equipment 108 may include configuring a transmitter or receiver (e.g., radio, antenna or modem, among others) of the user equipment 108 to cease data communication when the user equipment 108 leaves the PAL protection area. For example, the user equipment 108 may receive information indicating the geographic boundaries of the PAL protection area from the UE provisioning server 104 or the CBSD 106 and store the information in a memory of the user equipment 108. As described herein, the user equipment 108 includes position circuitry that identifies the position of the user equipment 108. The transmitter or receiver of the user equipment 108 may evaluate whether the user equipment 108 is within or outside of the PAL protection area. If transmitter or receiver determines that the user equipment 108 is no longer within the PAL protection area, the transmitter or receiver may cease transmission or reception, respectively. The transmitter or receiver may perform the evaluation periodically or according to a different time schedule. The transmitter or receiver may perform the evaluation before data transmission or reception, respectively, is initiated.

In response to determining, at 304, that the user equipment 108 is to be fenced out of the PAL protection area, the UE provisioning server 104, at 308, provisions the user equipment 108 to exclude the user equipment 108 from operating within the PAL protection area. Similar techniques as those described herein in relation to fencing in the user equipment 108 may be used for provisioning the user equipment 108 to fence out the user equipment 108.

For example, provisioning the user equipment 108 may include configuring the SIM or eSIM of the user equipment 108 to cause the user equipment 108 to cease data transmission and reception when the user equipment 108 is inside the PAL protection area. The UE provisioning server 104 may send eSIM profile information to the user equipment 108, whereby the eSIM profile information may limit the user equipment 108 to operating outside of the PAL protection area. The profile information may include a key or an ID that specifies (or encodes) a restriction limiting the user equipment 108 to operating outside the PAL protection area. The provisioning may include removing one or more keys from the eSIM profile. Thus, the user equipment 108 no longer has access to the one or more keys, and the user equipment 108 cannot properly descramble or decode data from the CBSD 106 as to recover its contents when the user equipment 108 is inside the PAL protection area. Provisioning the user equipment 108 may include configuring software (e.g., software application), code or operational or executable instructions of the user equipment 108 to cause the user equipment 108 to cease data communication. For example, the executable instructions of the user equipment 108 may be independently configured to cause the user equipment 108 to refrain from initiating transmission or reception operations when the user equipment 108 enters the PAL protection area. Alternatively, the executable instructions of the user equipment 108 may be configured to access an eSIM or SIM of the user equipment 108 in order to determine whether the user equipment 108 is fenced out in relation to a PAL protection area. If the user equipment 108 is fenced out, then the software of the user equipment 108 may self-enforce the fencing. Provisioning the user equipment 108 may include configuring the transmitter or receiver of the user equipment 108 to cease data communication when the user equipment 108 enters the PAL protection area. For example, the user equipment 108 may receive information indicating the geographic boundaries of the PAL protection area. The transmitter or receiver of the user equipment 108 may evaluate whether the user equipment 108 is within or outside of the PAL protection area. If transmitter or receiver determines that the user equipment 108 is inside the PAL protection area, the transmitter or receiver may cease transmission or reception, respectively.

An operator may prevent the user equipment 108 of a subscriber from operating in PAL protection areas of certain CBSDs. The operator may permit the user equipment 108 to operate in some PAL protection areas and prevent the user equipment 108 from operating in other PAL protection areas. The operator may provision the user equipment 108 accordingly.

Figure 4:
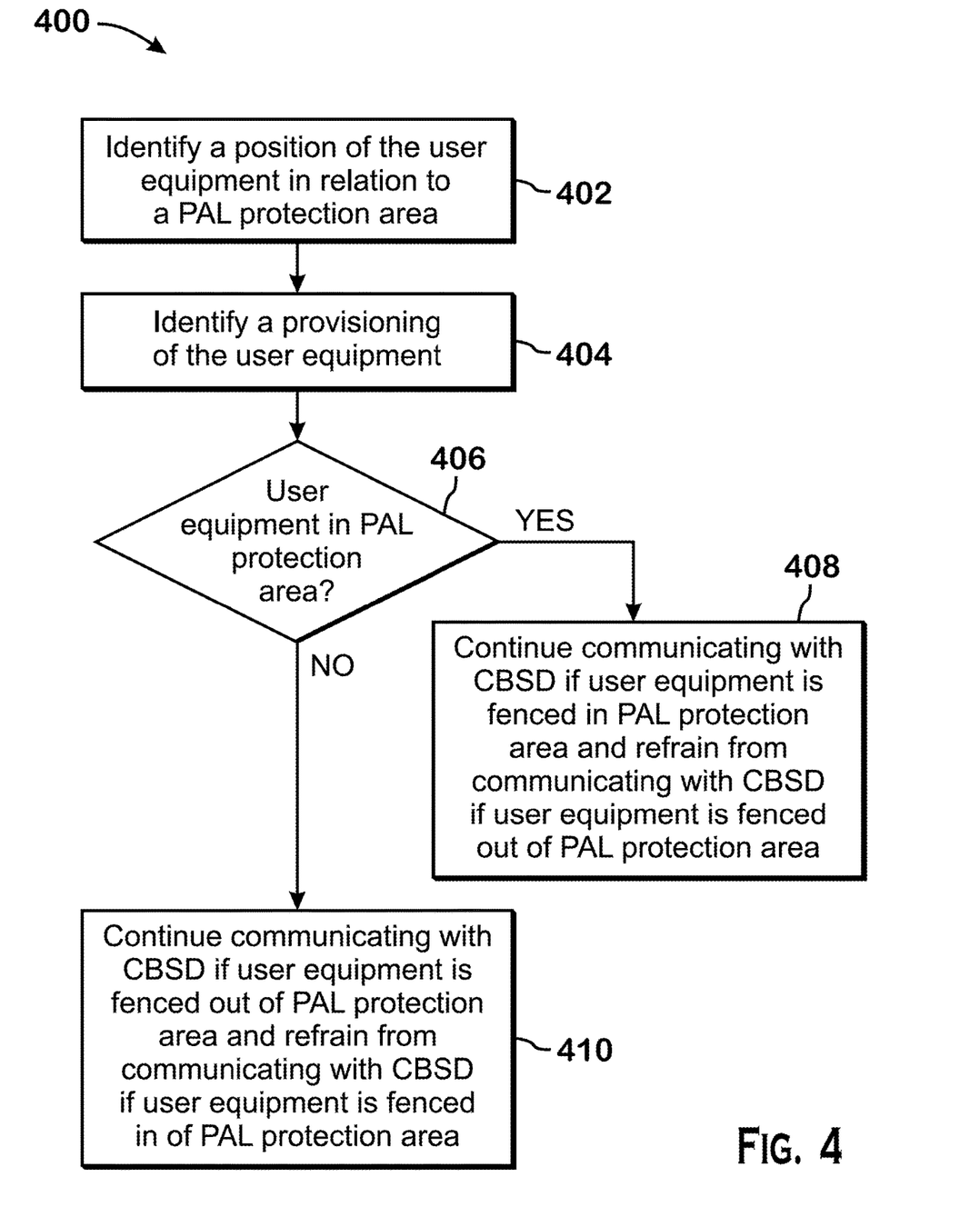
FIG. 4 shows a flow diagram of a method for operating the user equipment.

FIG. 4 shows a flow diagram of a method 400 for operating the user equipment 108. In the method 400, an entity, such as the user equipment 108, the CBSD 106 or the UE provisioning server 104, identifies, at 402, a position of the user equipment in relation to a PAL protection area. As described herein, the user equipment 108, the CBSD 106 or the UE provisioning server 104 may identify the position based on GPS techniques, among others. Further, the user equipment 108, the CBSD 106 or the UE provisioning server 104 may receive an identification of the boundaries of a PAL protection area from the SAS server 102. Thus, the user equipment 108, the CBSD 106 or the UE provisioning server 104 may identify the position of the user equipment in relation to a PAL protection area.

The user equipment 108, the CBSD 106 or the UE provisioning server 104, identifies, at 404, a provisioning of the user equipment 108. As described herein, the provisioning specifies whether the user equipment 108 is permitted to transmit data to and receive data from a CBSD or using a CBRS channel when the user equipment 108 is located within or outside of a PAL protection area of the CBSD.

The user equipment 108, the CBSD 106, or the UE provisioning server 104, at 406, determines whether the user equipment 108 is inside or outside of the PAL protection area (or whether the user equipment 108 has transitioned to be inside or outside of the PAL protection area). The user equipment 108 or the UE provisioning server 104 determines whether the user equipment 108 is to continue to communicate based on the position of the user equipment in relation to the Pal protection area and the provisioning of the user equipment.

If the user equipment 108, the CBSD 106, or the UE provisioning server 104 determines that the user equipment 108 is inside the PAL protection area, then the user equipment 108, at 408, continues communicating with the CBSD if the user equipment 108 is fenced in the PAL protection area and refrains from communicating with CBSD if the user equipment 108 is fenced out of the PAL protection area. Conversely, if the user equipment 108, the CBSD 106, or the UE provisioning server 104 determines that the user equipment 108 is outside of the PAL protection area, then the user equipment 108, at 410, continues communicating with the CBSD if the user equipment 108 is fenced out of the PAL protection area and refrains from communicating with the CBSD if the user equipment 108 is fenced in the PAL protection area. For example, if the user equipment 108 is permitted to operate within one or more PAL protection areas and the user equipment 108 relocated to be outside of the one or more PAL protection areas, then the user equipment 108 ceases communication. Furthermore, if the user equipment 108 is prohibited from operating within one or more PAL protection areas and the user equipment 108 relocated to be inside of the one or more PAL protection areas, then the user equipment 108 ceases communication.

The CBSD 106 may send boundary information indicating a boundary of a PAL protection area to the user equipment 108. The CBSD 106 may send boundary information using control signaling or higher-layer signaling. During operation of the user equipment 108, the user equipment 108 may check the configuration information of the user equipment 108 that is stored in the eSIM/SIM. If the configuration information indicates that the user equipment 108 should be fenced inside the boundary of the PAL protection area, then the user equipment 108 may evaluate whether the user equipment 108 has exited the PAL protection area and, accordingly, whether communication should be ceased. Conversely, if the configuration information indicates that the user equipment 108 should be fenced out of the boundary of the PAL protection area, then the user equipment 108 may evaluate whether the user equipment 108 has entered into the PAL protection area.

The evaluation may be performed periodically (for example, every ten minutes or one hour) or in response to a criterion being satisfied. The criterion may be satisfied if the user equipment 108 changes position by a certain amount (such as 50 feet). For example, every time the position of the user equipment 108 changes by 50 feet or more, the user equipment 108 evaluates whether the user equipment 108 has left a PAL protection area inside of which the user equipment 108 is fenced or entered a PAL protection area outside of which the user equipment 108 is fenced.

It is noted that ceasing communication may include ceasing transmission and reception of non-emergency user data, such as user internet traffic and user voice and video traffic. However, even when communication is ceased due to user equipment 108 fencing, the user equipment 108 may still be permitted to exchange emergency user data (such as emergency calls, natural disaster warnings and notifications and law enforcement warnings and notifications) and control information with the CBSD 106 or other network entities. The control information may include configuration information used to reconfigure the eSIM. The control information may also include higher-layer signaling, status reports, user equipment position information and generally any other non-user data.

Figure 5:
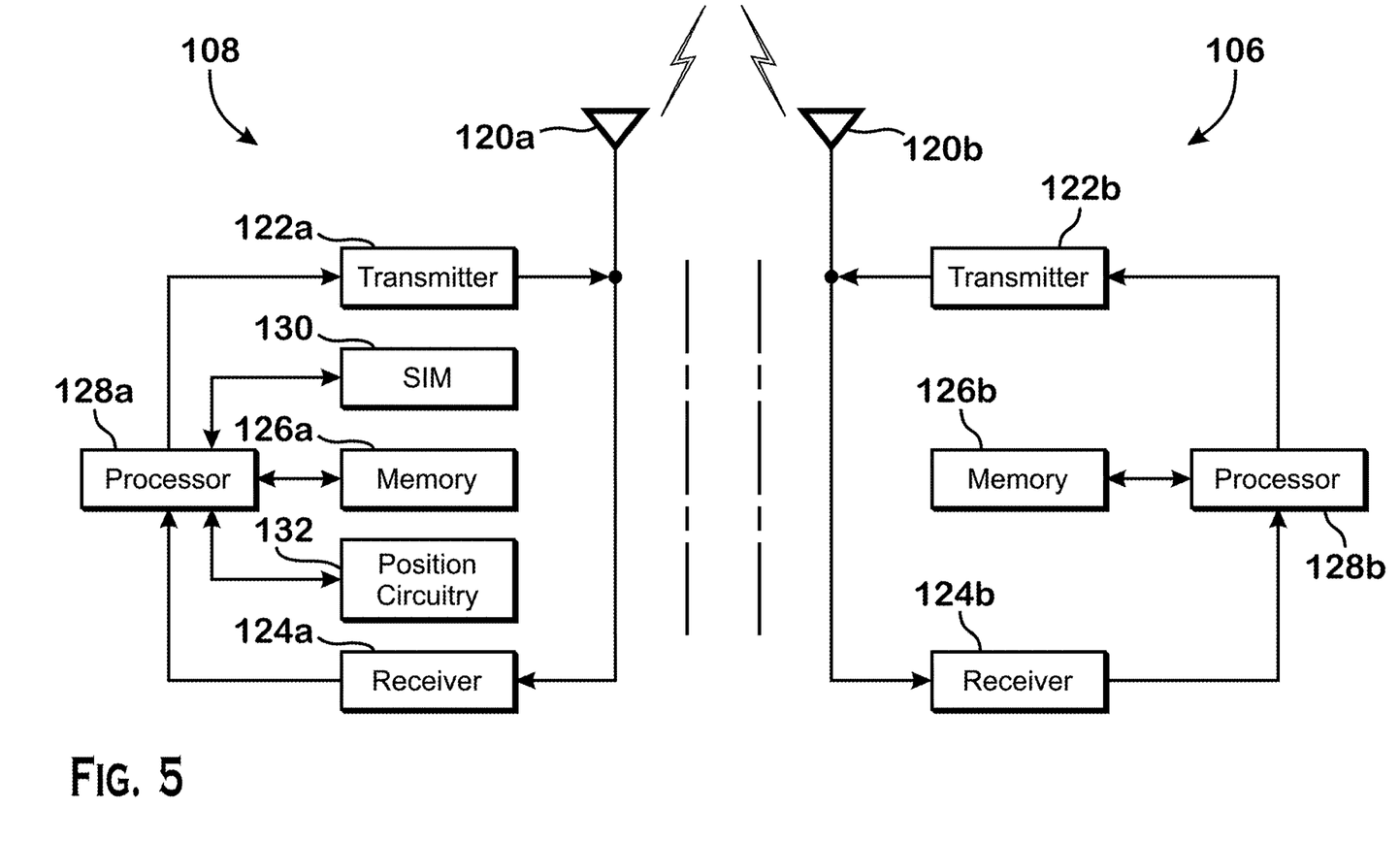
FIG. 5 shows a block diagram of a CBSD and the user equipment.

FIG. 5 shows a block diagram of a CBSD 106 and a user equipment 108. The user equipment 108 transmits data to the CBSD 106 in the uplink and receives data transmitted from the CBSD 106 in the downlink. The user equipment 108 includes one or more antennas 120a for receiving signals, which may be electromagnetic signals. The user equipment 108 includes a transmitter 122a. The transmitter 122a may be any type of device configured to transmit a signal by controlling the one or more antennas 120a. The user equipment 108 includes a receiver 124a, which may be any type of device configured to transmit a signal by controlling the one or more antennas 120a.

The user equipment 108 includes memory 126a. The memory 126a may be any type of non-transitory computer-readable storage medium. The memory 126a may be read-only memory (ROM) or random access memory (RAM), among others. Further, the memory 126a may be static or dynamic. The memory 126a stores the computer-executable instructions that may be retrieved or accessed by a processor 128a for execution. The computer-executable instructions, when executed by the processor 128a cause the processor 128a (or the user equipment 108 to operate as described herein.

The user equipment 108 includes include the processor 128a. The processor 128a is configured to perform the techniques and methods described herein, such as the method 400 described with reference to FIG. 4. The transmitter 122a, the memory 126a, the receiver 124a, the processor 128a and the one or more antennas 120a within the user equipment 108 may be configured to communicate with each other. The transmitter 122a, receiver 124a, memory 126a and processor 128a of the user equipment 108 may respectively be implemented by a separate chip as independent elements, or may be implemented by two or more chips. The transmitter 122a and the receiver 124a may be incorporated into one device, whereby one transceiver may be implemented within the user equipment 108. The one or more antennas 120a may be configured to wirelessly transmit a signal generated by the transmitter 122a to an external environment, or receive a radio signal from the external environment and transfer the received radio signal to the receiver 124a. Transmission and reception devices that support multi-input multi-output (MIMO) communication for data transmission and reception based on multiple antennas may be used.

The processor 128a may perform various control functions for performing the techniques described herein. The processor 128a may be a controller, a microcontroller, a microprocessor, or a microcomputer. The processor 128a may be implemented by hardware, firmware, software, or their combination. Application-specific integrated circuits (ASICs), digital signal processors (DSPs), digital signal processing devices (DSPDs), programmable logic devices (PLDs), and field programmable gate arrays (FPGAs), which are configured to perform the techniques described herein, may be provided in the processor 128a.

The transmitter 122a may perform coding and modulation of data, which are scheduled from the processor 128a or a scheduler coupled to the processor 128a. For example, the transmitter 122a may convert data streams intended for transmission into signal streams through de-multiplexing, channel coding, modulation, and the like. The signal streams are transmitted through a transmitting processor within the transmitter and the transmitting antenna 120a. The transmitter 122a and the receiver 124a of the user equipment 108 and of the CBSD 106 described herein may be configured differently depending on a processing procedure of transmitting and receiving signals.

The user equipment 108 includes a SIM 130. The SIM 130 may be an integrated circuit that stores an international mobile subscriber identity (IMSI) number for authenticating the user equipment 108. The SIM 130 may be part of a (UICC) of the user equipment 108. In addition, the SIM 130 may include identifiers of one or more PAL protections areas and an indication, for each PAL protections area, of whether the user equipment 108 is permitted or prohibited from operating in the area. As described herein, operating in an area includes transmitting or receiving data to a CBSD or using a CBSD channel. Further, the SIM 130 may include an Integrated Circuit Card Identification Number (ICCID), authentication and ciphering information and services to which the user equipment 108 has access. It is noted that in addition or as an alternative to the SIM, the user equipment 108 may include an eSIM that is part of a software-based eUICC. The configurations and identities associated with the user equipment 108 may be held by the eSIM instead of the SIM. Further, the user equipment 108 may have both SIM and eSIM identity modules.

The user equipment 108 includes a position circuitry 132. The position circuitry 132 may be a Global Navigation Satellite System (GNSS) receiver or a GPS receiver. Further, the position circuitry 132 or functionality thereof may be hardware-implemented or software-implemented (e.g., by the processor 128a). The position circuitry 132 may receive signals (e.g., from Earth-orbiting satellites) that are usable for determining the position of the user equipment 108. The user equipment 108 may also use A-GPS techniques and determine the position of the user equipment 108 based on signals received from Earth-orbiting satellites and one or more CBSDs.

The CBSD 106 transmits data to the user equipment 108 in the downlink and receives data transmitted from the CBSD 106 in the uplink. The CBSD 106 includes one or more antennas 120b for receiving signals, which may be electromagnetic signals. The CBSD 106 includes a transmitter 122b. The transmitter 122b may be any type of device configured to transmit a signal by controlling the one or more antennas 120b. The CBSD 106 includes a receiver 124b, which may be any type of device configured to transmit a signal by controlling the one or more antennas 120b.

The CBSD 106 includes memory 126b. The memory 126b may be any type of non-transitory computer-readable storage medium. The memory 126b may be read-only memory (ROM) or random access memory (RAM), among others. Further, the memory 126b may be static or dynamic. The memory 126b stores the computer-executable instructions that may be retrieved or accessed by a respective processor 128b for execution. The computer-executable instructions, when executed by the processor 128b, cause the respective processor 128b (or the CBSD 106) to operate as described herein.

The CBSD 106 includes the processor 128b. The processor 128b is configured to perform the techniques and methods described herein, such as the method 300 described herein. The transmitter 122b, the memory 126b, the receiver 124b, the processor 128b and the one or more antennas 120b within the CBSD 106 may be configured to communicate with each other. The transmitter 122b, receiver 124b, memory 126b and processor 128b of the CBSD 106 may respectively be implemented by a separate chip as independent elements, or may be implemented by two or more chips. The transmitter 122*b* and the receiver 124*b* may be incorporated into one device, whereby one transceiver may be implemented within the CBSD 106. The one or more antennas 120*b* may be configured to wirelessly transmit a signal generated by the transmitter 122*b* to an external environment, or receive a radio signal from the external environment and transfer the received radio signal to the receiver 124*b*. Transmission and reception devices that support multi-input multi-output (MIMO) communication for data transmission and reception based on multiple antennas may be used.

The processor 128*b* may perform various control functions for performing the techniques described herein, such as the method 300 described herein. The processor 128*b* may be a controller, a microcontroller, a microprocessor, or a microcomputer. The processor 128*b* may be implemented by hardware, firmware, software, or their combination. Application-specific integrated circuits (ASICs), digital signal processors (DSPs), digital signal processing devices (DSPDs), programmable logic devices (PLDs), and field programmable gate arrays (FPGAs), which are configured to perform the techniques described herein, may be provided in the processor 128*b*.

The transmitter 122*b* may perform coding and modulation of data, which are scheduled from the processor 128*b* or a scheduler coupled to the processor 128*b*. For example, the transmitter 122*b* may convert data streams intended for transmission into signal streams through de-multiplexing, channel coding, modulation, and the like. The signal streams are transmitted through a transmitting processor within the transmitter and the transmitting antenna 120*b*. The transmitter 122*b* and the receiver 124*b* of the CBSD 106 may be configured differently depending on a processing procedure of transmitting and receiving signals.

Figure 6:
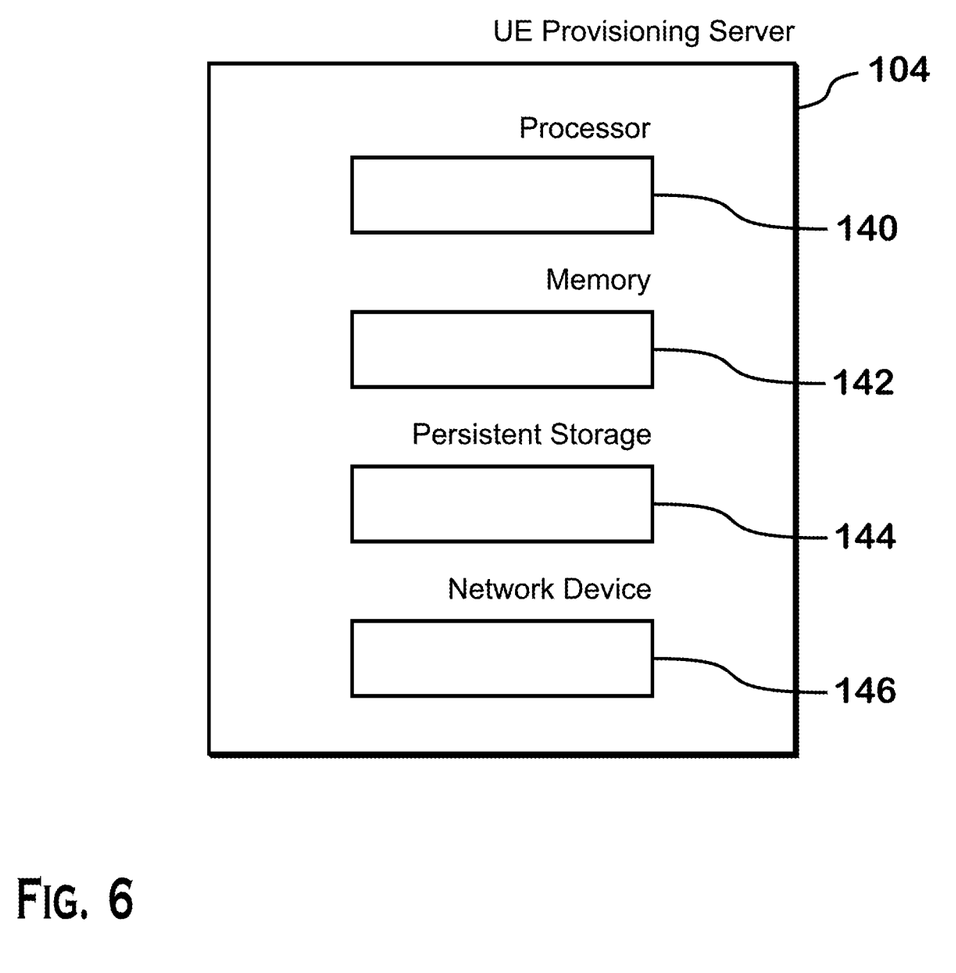
FIG. 6 shows a block diagram of a user equipment provisioning server.

FIG. 6 shows a block diagram of a UE provisioning server 104. The UE provisioning server 104 may be one or more server computer systems, cloud computing platforms or virtual machines, desktop computer systems, laptop computer systems, netbooks, mobile phones, personal digital assistants, televisions, cameras, automobile computers or electronic media players, among others.

The UE provisioning server 104 includes a processor 140. The processor 140 may be a controller, microcontroller or microprocessor, and may include a central processing unit ("CPU") or an arithmetic and logic unit (ALU) for executing computer programs or executable instructions. The UE provisioning server 104 uses the processor 140 to perform the techniques described herein, such as the method 200 described herein. The UE provisioning server 104 includes memory 142 for storing executable instruction and data. The processor 140 executes the executable instructions, which causes the processor 140 to perform the operations described herein. The memory 142 may also store an operating system including a kernel and device drivers.

The UE provisioning server 104 includes a persistent storage device 144, which may be a hard drive or a flash drive, among others. The persistent storage device 144 persistently stores programs and data. The UE provisioning server 104 includes a networking device 146 for enabling the UE provisioning server 104 to communicate with other devices. The networking device 146 may be a modem, antenna, radio transmitter, receiver or transceiver, optical transmitter, receiver or transceiver or wireless or wired port, among others. Further, the UE provisioning server 104 may include networking hardware, such as switches, routers or repeaters, among others. The UE provisioning server 104 may output data over the networking device 146 to user equipment 108 or to the CBSD 106 for sending to the user equipment 108.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment provisioning server, comprising:
a processor; and
memory configured to store executable instructions that, when executed by the processor, cause the processor to:
receive an indication of a priority access license (PAL) protection area associated with a citizens broadband radio service device (CBSD) of an operator having a priority access license to a Citizens Broadband Radio Service (CBRS) channel of a CBRS band,
the PAL protection area representing a geographic area surrounding the CBSD and in which the CBSD uses the CBRS channel;
determine whether to fence a user equipment of a subscriber of the operator inside or outside of the PAL protection area; and
provision the user equipment to limit the user equipment to operating within the PAL protection area or exclude the user equipment from operating within the PAL protection area,
wherein provisioning the user equipment includes configuring a profile of an embedded-Subscriber Identity Module (eSIM) of the user equipment with configuration information specifying whether the user equipment is limited to operating within the PAL protection area or excluded from operating within the PAL protection area.

2. The user equipment provisioning server of claim 1, wherein the executable instructions, when executed by the processor, cause the processor to:
send the configuration information to the user equipment for configuring the profile of the eSIM.

3. The user equipment provisioning server of claim 1, wherein the executable instructions cause the processor to:

receive the indication of the PAL protection area from a spectrum access system (SAS) server, wherein the PAL protection area is determined based on:
a location of the CBSD,
an effective isotropic radiated power (EIRP) of the CBSD,
a height, gain, azimuth or beam width of an antenna of the CBSD, and
a propagation model.

4. A system, comprising:
user equipment of a subscriber of an operator;
a citizens broadband radio service device (CBSD) having a priority access license (PAL) protection area and managed by the operator having a priority access license to a Citizens Broadband Radio Service (CBRS) channel of a CBRS band,
the PAL protection area representing a geographic area surrounding the CBSD and in which the CBSD uses the CBRS channel; and
a user equipment provisioning server configured to:
receive an indication of the PAL protection area associated with the CBSD;
determine whether to fence a user equipment inside or outside of the PAL protection area; and
provision the user equipment to limit the user equipment to operating with in the PAL protection area or exclude the user equipment from operating within the PAL protection area by:
configuring a profile of an embedded-Subscriber Identity Module (eSIM) of the user equipment with configuration information specifying whether the user equipment is limited to operating within the PAL protection area or excluded from operating within the PAL protection area.

5. The system of claim 4, wherein the user equipment is configured to:
receive the configuration information specifying that the user equipment is limited to operating within the PAL protection area or excluded from operating within the PAL protection area; and
modify the profile of the eSIM of the user equipment based on the configuration information.

6. The system of claim 4, wherein the user equipment is configured to:
receive boundary information of the PAL protection area;
determine a position of the user equipment;
receive the configuration information specifying that the user equipment is limited to operating within the PAL protection area or excluded from operating within the PAL protection area; and
determine, based on the boundary information, the position of the user equipment and the configuration information, whether the user equipment is to communicate with the CBSD or on the CBRS channel.

7. The system of claim 4, wherein the user equipment provisioning server is configured to:
receive the indication of the PAL protection area from a spectrum access system (SAS) server, wherein the PAL protection area is determined based on:
a location of the CBSD,
an effective isotropic radiated power (EIRP) of the CBSD,
a height, gain, azimuth or beam width of an antenna of the CBSD, and
a propagation model.

8. The system of claim 4, wherein the user equipment is configured to:

in response to being limited to operating within the PAL protection area, refrain from transmitting non-emergency user data to the CBSD when the user equipment is positioned outside of the PAL protection area, or
in response to being excluded from operating within the PAL protection area, refrain from transmitting the non-emergency user data to the CBSD when the user equipment is positioned inside of the PAL protection area.

9. The system of claim 8, wherein the user equipment is configured to:
in response to being limited to operating within the PAL protection area, transmit emergency user data to the CBSD when the user equipment is positioned outside of the PAL protection area, or
in response to being excluded from operating within the PAL protection area, transmit the emergency user data to the CBSD when the user equipment is positioned inside of the PAL protection area.

10. The system of claim 4, wherein the user equipment is configured to:
in response to being limited to operating within the PAL protection area, receive control information from the CBSD when the user equipment is positioned outside of the PAL protection area, or
in response to being excluded from operating within the PAL protection area, receive control information from the CBSD when the user equipment is positioned inside of the PAL protection area.

11. A method, comprising:
operating, by a citizens broadband radio service device (CBSD), in a Citizens Broadband Radio Service (CBRS) channel of a CBRS band, the CBSD having a priority access license (PAL) protection area and being managed by the operator having a priority access license to the CBRS channel,
the PAL protection area representing a geographic area surrounding the CBSD;
receiving, by a user equipment provisioning server, an indication of the PAL protection area associated with the CBSD;
determining, by the user equipment provisioning server, whether to fence a user equipment inside or outside of the PAL protection area; and
provisioning, by the user equipment provisioning server, the user equipment to limit the user equipment to operating within the PAL protection area or exclude the user equipment from operating within the PAL protection area,
wherein provisioning the user equipment includes:
configuring a profile of an embedded-Subscriber Identity Module (eSIM) of the user equipment with configuration information specifying whether the user equipment is limited to operating within the PAL protection area or excluded from operating within the PAL protection area.

12. The method of claim 11, comprising:
receiving, by the user equipment, the configuration information specifying that the user equipment is limited to operating within the PAL protection area or excluded from operating within the PAL protection area; and
modifying, by the user equipment, the profile of the eSIM of the user equipment based on the configuration information.

13. The method of claim 11, comprising:
receiving, by the user equipment, boundary information of the PAL protection area;

determining, by the user equipment, a position of the user equipment;

receiving, by the user equipment, the configuration information specifying that the user equipment is limited to operating within the PAL protection area or excluded from operating within the PAL protection area; and determining, based on the boundary information, the position of the user equipment and the configuration information, whether the user equipment is to communicate with the CBSD or on the CBRS channel.

14. The method of claim 11, comprising:

receiving, by the user equipment provisioning server, the indication of the PAL protection area from a spectrum access system (SAS) server, wherein the PAL protection area is determined based on:
   a location of the CBSD,
   an effective isotropic radiated power (EIRP) of the CBSD,
   a height, gain, azimuth or beam width of an antenna of the CBSD, and
   a propagation model.

15. The method of claim 11, comprising:

in response to being limited to operating within the PAL protection area, refraining, by the user equipment, from transmitting non-emergency user data to the CBSD when the user equipment is positioned outside of the PAL protection area, or in response to being excluded from operating within the PAL protection area, refraining, by the user equipment, from transmitting the non-emergency user data to the CBSD when the user equipment is positioned inside of the PAL protection area.

16. The method of claim 15, comprising:

in response to being limited to operating within the PAL protection area, transmitting, by the user equipment, emergency user data to the CBSD when the user equipment is positioned outside of the PAL protection area, or in response to being excluded from operating within the PAL protection area, transmitting, by the user equipment, the emergency user data to the CBSD when the user equipment is positioned inside of the PAL protection area.

17. The method of claim 11, comprising:

in response to being limited to operating within the PAL protection area, receiving, by the user equipment, control information from the CBSD when the user equipment is positioned outside of the PAL protection area, or in response to being excluded from operating within the PAL protection area, receiving, by the user equipment, control information from the CBSD when the user equipment is positioned inside of the PAL protection area.

\* \* \* \* \*